May 10, 1927.
H. H. PAYZANT
SYSTEM OF FEED CONTROL
Filed May 23, 1925
1,627,925
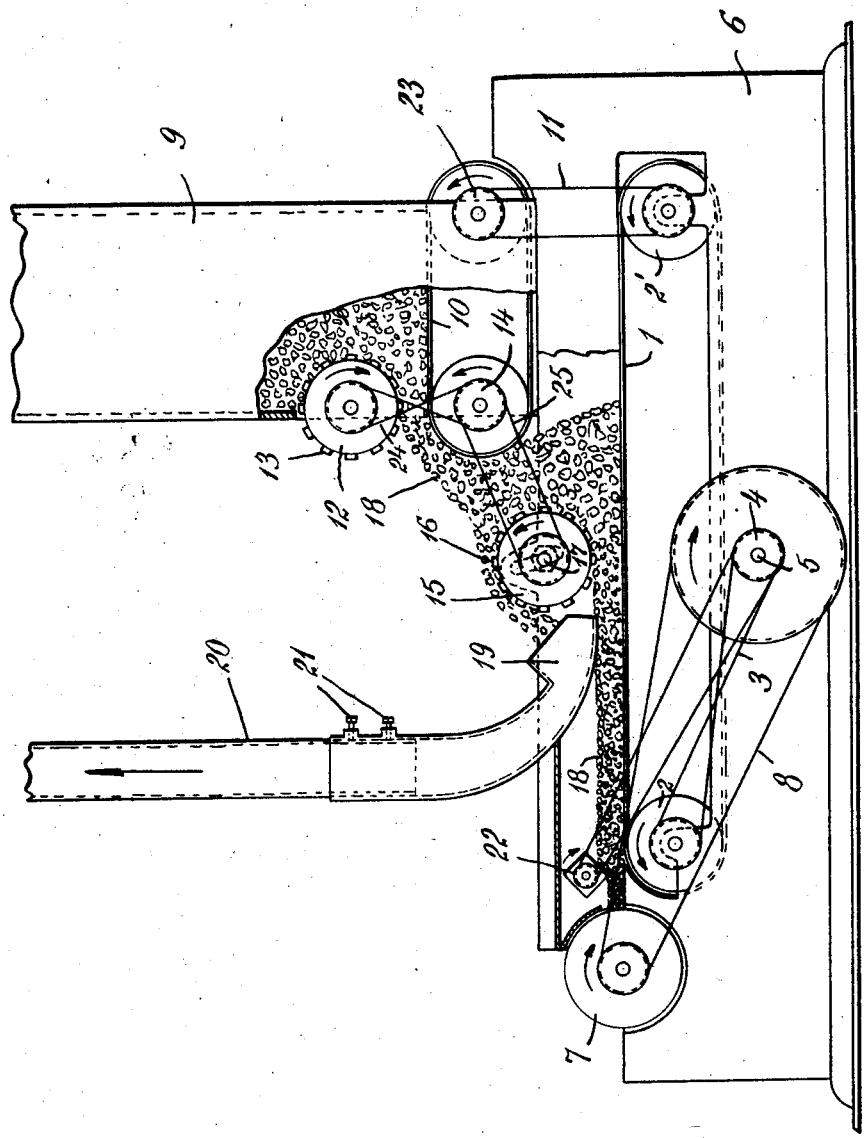
INVENTOR
BY
ATTORNEYS Patented May 10, 1927.

1,627,925

UNITED STATES PATENT OFFICE.

HENRY HARRIS PAYZANT, OF EVERETT, WASHINGTON, ASSIGNOR TO WOOD CONVERSION COMPANY, OF CLOQUET, MINNESOTA, A CORPORATION OF DELAWARE.

SYSTEM OF FEED CONTROL.

Application filed May 28, 1925. Serial No. 33,407.

This invention relates to a method of handling loose material, such as wood chips, for the purpose of supplying the material to apparatus of any character at a substantially uniform rate. The invention also includes a feed control system capable of regulating the supply of material in small pieces to apparatus adapted to receive such material.

It is well known to those who have had occasion to handle large quantities of material in small pieces, that it is not an easy matter to supply such material to apparatus of any kind at a uniform rate, due to the tendency of the material to become clogged. In many industries, such as those concerned with the conservation of waste materials, this matter of feeding and conveying loose material assumes considerable importance.

My invention was devised with a view to providing an efficient method of handling loose material whereby the material can be fed or conveyed at a substantially constant rate. In general, the improved method consists in simultaneously separating a portion of the loose material supplied by a feeding mechanism, from the major portion of the material and forming the remaining material into a layer of uniform thickness. The invention, in its broader aspect, includes supplying material in small pieces to a traveling support or conveyor and subjecting the material so supplied to the traveling support, to the action of a device which simultaneously segregates a portion of the material and shapes the remaining material into a layer of uniform dimensions on the traveling support. The improved method may also include the step of returning the material so segregated, to the source of supply. The apparatus I have devised for carrying out this process includes means for supplying loose material such as wood chips to a traveling support, and a rotating member adapted to segregate any excess material supplied by the feeding mechanism, and to shape the major portion of the material supplied to the traveling support into a layer of uniform thickness. In addition, I prefer to provide means for returning the separated material back to the source of supply.

This invention may be applied to a large number of industrial projects, but in describing the invention in detail I prefer to consider its application to the particular problem of handling wood chips or pulp preparatory to feeding this material to a disintegrating machine. Accordingly, I have illustrated in the single figure of the accompanying drawing, an apparatus especially adapted to handle wood chips in the manner above described. This apparatus includes a disintegrating machine partly enclosed in a casing which also serves as a supporting structure for a conveyor and the necessary shafting.

In the accompanying drawing, the numeral 1 designates an ordinary conveyor supported by pulleys 2 and 2' which are driven by means of a belt 3 connecting pulley 2 with a pulley 4 on a drive shaft 5. The pulleys 2 and 2' and the drive shaft 5 are carried by the framework 6, and this framework encloses a disintegrating machine, the rotating drum 7 of which is driven by means of a pulley connected to the driver shaft 5. The conveyor 1 is adapted to supply wood chips 18 to the rotating drum 7.

The wood chips are supplied to the traveling conveyor 1 from a chute 9 leading from a storage bin (not shown). A suitable feeding mechanism is provided for the purpose of facilitating the discharge of chips from the lower end of the chute 9. The particular feeding apparatus illustrated in the accompanying drawing includes a second belt conveyor 10 located at the base of the chute 9. This second conveyor is driven in any suitable manner, for example by means of the belt 11, connecting the pulley 23 of this second conveyor with the pulley 2'. The feeding mechanism should be of such a character that it provides a substantially uninterrupted flow of chips from the chute 9. Accordingly, I prefer to employ means in addition to the conveyor 10 for discharging the material from the chute 9. The rotating drum 12 located above the conveyor 10 is provided for this purpose. This drum is preferably driven by means of a belt 24 connected to the pulley 14 of the conveyor 10. Projecting ribs 13 are provided on the surface of the drum 12 to increase the efficiency of this drum as a means for forcing the chips out of the chute 9.

I have found that such a rotating drum in combination with a conveyor, such as that illustrated at 10, forms an efficient feeding mechanism for handling material such as wood chips. The opposed faces of these two parts travel in the same direction and carry the chips out of the chute 9 in a substantially uninterrupted stream. The chips 18, in passing out of the chute 9, fall onto the conveyor 1 where they pile up as shown in the drawing.

If no apparatus were provided other than that above described, the wood chips 18 would be deposited on the conveyor 1 so as to form a non-uniform row or layer of material moving toward the rotating drum 7. As a result the disintegrating machine would run substantially idle at times and at other times this machine would be completely chocked, due to a sudden increase in the amount of material supplied thereto by the conveyor. In order to obviate this undesirable condition, I prefer to subject the material deposited on the conveyor 1 to the action of apparatus which forms this material into a uniform layer, and prevents the conveyor from supplying an excess amount of material to the disintegrating machine at any time. My improved process of handling loose material, however, includes simultaneously shaping the material into a layer of substantially uniform dimensions and removing any excess material.

The apparatus I have devised for carrying out my process consists of a rotating member, preferably in the form of a drum 15, adjustably mounted on the supporting structure 6. This drum may be of substantially the same construction as the rotating drum 12 above described. I prefer to provide ribs 16 around the periphery of this drum, the same as the ribs 13 provided on the drum 12. A suitable means is provided for rotating the drum 15 in such a manner that the opposed surfaces of this drum and the conveyor 1 move in opposite directions. This movement of the drum 15 can be effected by means of a belt 25 connected to the pulley 14. The shaft 17 of the drum 15 is supported in bearings which can be adjusted vertically in slots provided for this purpose. If a belted connection such as that just described is used for the purpose of driving the drum 15, the adjusting slots should be in the form of arcs so as to keep the belt taut when the drum is adjusted to different positions. The position of the drum 15 determines the thickness of the layer of material supplied to the disintegrating machine; by increasing the distance between this drum and the conveyor 1, the amount of material supplied to the drum 7 is increased accordingly.

I prefer to adjust the feeding mechanism associated with the chute 9 so as to supply a quantity of material slightly in excess of the quantity which is to be supplied to the drum 7. It is desirable to supply material to the conveyor 1 in this manner so as to compensate for any ordinary interruptions in the flow of material from the chute 9. The rotating drum 15 performs the double function of shaping the loose material into a layer of uniform thickness and removing any excess material from the conveyor, the excess material being lifted by the drum and deposited in a suitable hopper 19 arranged in close proximity to the drum. The drum serves as a means for preventing the chips from accumulating in large quantities on the conveyor 1 in case the feeding mechanism discharges chips from the chute 9 at a considerably faster rate than they are being conveyed to the drum 7.

I prefer to provide some means for carrying the excess material deposited in the hopper 19, back to the source of supply, for example, the storage bin above referred to. Where the material is light enough to be conveyed by air, a blower may be provided for the purpose of conveying the excess material back to the source of supply. Accordingly, I have illustrated a blower chute 20 connected to the hopper 19. Adjusting means, for example the set screws 21, engaging the chute 20, are provided for the purpose of making it possible to adjust the position of the hopper 19 with respect to the conveyor 1. I have found that the best results are obtained when the hopper 19 and the roller 15 are at substantially the same height above the conveyor 1. The construction and shape of the hopper can be varied to suit the character of material being handled.

It is oftentimes desirable to compact the layer of loose material before it passes into the disintegrating machine or other apparatus intended to receive the material. Accordingly, I have illustrated a square rotatable member 22 located in close proximity to the rotating drum 7 and driven by the drive shaft 5. The faces of this square member compress the advancing layer of material, as shown in the drawing.

The above description, relating particularly to the apparatus which I have devised for regulating the supply of loose material conveyed to a disintegrating machine, sets forth the salient features of my improved process. This process and the apparatus above described can of course be used in handling materials other than wood chips or pulp and various details can be modified to suit particular requirements. For example, while I prefer to have the rotating drum 15 in close proximity to the feeding mechanism, yet it will be appreciated that this relation of the parts is not absolutely necessary, the important feature being the provision of means for simultaneously effecting a separation of the excess material from the main portion of the material, and the formation of the remaining material into a uniform layer. Likewise, feeding mechanisms different from that disclosed in the accompanying drawings may be employed to good advantage, the particular construction of the feeding mechanism depending to some extent upon the nature of the material being handled.

The material treated or handled in the manner above prescribed may be material other than the wood chips or pulp specifically mentioned above. While I have found this invention particularly useful in handling a light material such as chips, yet it may be used to advantage with any material which can be separated and formed into a layer substantially as described above, and it will be understood that the expression "loose material" used throughout the description and claims is intended to include all such materials.

I claim:

1. The method of forming loose material into a layer of uniform thickness, which consists in continuously depositing an excessive amount of the material onto a traveling support, and simultaneously shaping a portion of the material into a layer and lifting the excess away from said layer.

2. The method of forming loose material into a layer of uniform thickness, which consists in continuously depositing an excessive amount of material from a source of supply, onto a traveling support, and simultaneously shaping a portion of the material into a layer and lifting the excess away from said layer by means of a device rotating in such a manner that the opposed surfaces of said device and said support move in opposite directions.

3. An apparatus of the type described, comprising a traveling support, means for depositing an excessive amount of loose material upon such support, and means for simultaneously shaping a portion of the material into a layer of uniform thickness and lifting the excess away from said layer.

4. An apparatus of the type described, comprising a traveling support adapted to carry loose material, means for depositing an excessive amount of loose material on said support, a rotating drum adapted to engage the material on said support and to form a portion of it into a layer, and means associated with said drum for lifting the excess material away from said layer said drum being arranged so that the excess material is conveyed over the drum.

5. An apparatus of the type described, comprising a traveling support adapted to carry loose material, means for depositing an excessive amount of loose material on said support, a rotating drum adapted to engage the material on said support and to form it into a layer, means associated with said drum for removing the excess material, and means for adjusting the position of said drum with respect to said support, to vary the thickness of the layer of material.

6. An apparatus of the type described, comprising a traveling support adapted to carry loose material, means for depositing an excessive amount of loose material on said support, a drum mounted above said support, means for rotating said drum in opposition to said traveling support, and ribs on said drum for engaging the material to separate the excess material said drum being constructed and arranged so that the excess material is conveyed over the drum in the direction of travel of said support.

7. An apparatus of the type described, comprising a traveling support adapted to carry loose material, means for depositing an excessive amount of loose material on said support, a drum mounted above said support, means for rotating said drum in opposition to said traveling support, ribs on said drum for engaging the material to separate the excess material, a hopper for receiving the excess material, means for adjusting the hopper with respect to the traveling support and means for removing the excess material from the hopper.

In testimony whereof I affix my signature.

HENRY HARRIS PAYZANT.